(12) United States Patent
Li et al.

(10) Patent No.: US 10,650,048 B2
(45) Date of Patent: May 12, 2020

(54) MANAGING COMPLEX SERVICE DEPENDENCIES IN A DATA INTEGRATION SYSTEM

(71) Applicant: Baidu USA LLC, Sunnyvale, CA (US)

(72) Inventors: Zhuang Li, Sunnyvale, CA (US); Yifei Jiang, Sunnyvale, CA (US); Dong Li, Sunnyvale, CA (US); Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 727 days.

(21) Appl. No.: 15/261,459

(22) Filed: Sep. 9, 2016

(65) Prior Publication Data

US 2018/0075158 A1     Mar. 15, 2018

(51) Int. Cl.
| | | |
|---|---|---|
| G06F 16/90 | (2019.01) | |
| G06F 16/901 | (2019.01) | |
| G06F 8/41 | (2018.01) | |
| G06F 16/245 | (2019.01) | |

(52) U.S. Cl.
CPC .......... G06F 16/9024 (2019.01); G06F 8/433 (2013.01); G06F 16/245 (2019.01)

(58) Field of Classification Search
None
See application file for complete search history.

(56) References Cited

U.S. PATENT DOCUMENTS

| | | | | |
|---|---|---|---|---|
| 7,620,653 | B1* | 11/2009 | Swartz | G06F 16/972 |
| 7,912,873 | B2* | 3/2011 | Or | G06F 16/252 |
| | | | | 707/804 |
| 8,793,690 | B2* | 7/2014 | Vernier | G06F 9/5038 |
| | | | | 718/100 |
| 2004/0049565 | A1* | 3/2004 | Keller | G06F 11/0709 |
| | | | | 709/223 |
| 2017/0099183 | A1* | 4/2017 | Vaidyanathan | G05B 19/052 |
| 2017/0161051 | A1* | 6/2017 | Nikam | G06F 8/65 |
| 2017/0195183 | A1* | 7/2017 | Gershaft | H04L 41/12 |

* cited by examiner

*Primary Examiner* — Belix M Ortiz Ditren
(74) *Attorney, Agent, or Firm* — Womble Bond Dickinson (US) LLP

(57) ABSTRACT

Described is a data integration technique and system for providing data in response to a request. The data integration system may overcome the limits of a fixed scheduling system by implementing a service dependency graph (SDG). In particular, the data integration system may represent the SDG as a directed acyclic graph (DAG). Accordingly, the system may leverage the nature of DAGs in order to derive an efficient topological ordering for calling one or more services. Thus, the data integration system may retrieve and compile data in an efficient and scalable manner.

21 Claims, 7 Drawing Sheets

Topological Ordering = { D, C, B, and A }
460          or
{ C, D, B, and A }

MANAGING COMPLEX SERVICE DEPENDENCIES IN A DATA INTEGRATION SYSTEM

TECHNICAL FIELD

This disclosure relates generally to the field of data integration. More specifically, this disclosure relates to integrating data using a service dependency graph.

BACKGROUND

Generally, data integration involves the combination of data from different sources to provide meaningful information. For example, a user may query a variety of information about cities (such as weather, hotels, demographics, etc.). Traditionally, it was necessary for this information to be stored in a single database with, for example, a single schema. With data integration techniques, however, the data integration system may interact with multiple back-end processes to retrieve the data from various sources (e.g. databases).

Accordingly, when receiving the data from the various sources, the data integration system may aggregate the data using various integration techniques. In typical data integration systems, handling of such back-ends processes is performed using a fixed calling schedule. Based on the fixed calling schedule, however, it is often difficult for developers to share common processing logic for retrieving data. Accordingly, with new types of requests for data, a developer may have to re-implement back-end processing logic, which is often inefficient and error-prone.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments. Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

As described above, a challenge for developing a data integration system is the ability to provide an efficient mechanism for processing requests. The techniques and system described herein overcome the limitations of a fixed scheduling system. In some embodiments, the data integration system may refer to a service dependency graph (SDG). In addition, in some embodiments, the SDG may be pre-compiled to allow developers to access and reuse processing logic. For example, in one embodiment, the SDG may be modeled as a directed acyclic graph (DAG). Due to the nature of DAGs, an efficient topological ordering may be derived. Based on the derived ordering, a scheduler may determine an efficient sequence for accessing one or more services. Such a data integration technique may be implemented within a system.

Figure 1:
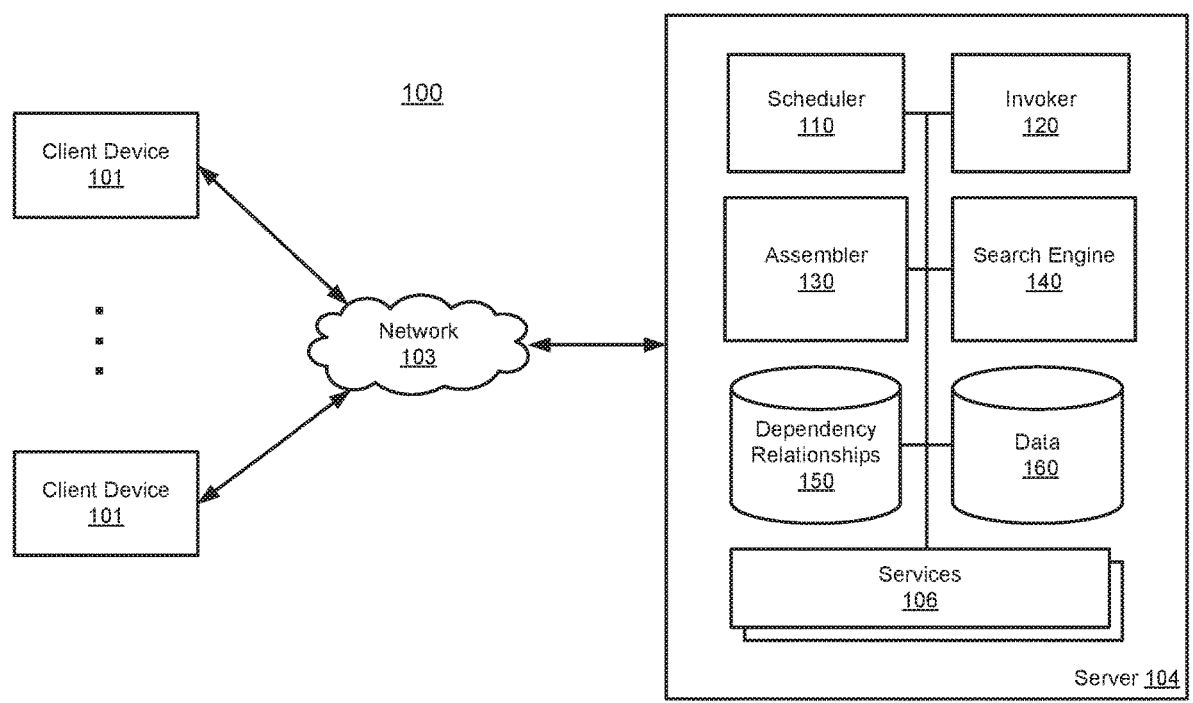
FIG. 1 is a block diagram illustrating an example system configuration according an embodiment of the disclosure.

FIG. 1 is a block diagram illustrating an example system configuration according an embodiment of the disclosure. The system 100 may include one or more client device(s) 101 communicatively coupled to server 104 via a network 103. Client device 101 (or client, or device) may be any type of computing device such as a personal computer (e.g. desktop, laptop, and tablet), a "thin" client, a personal digital assistant (PDA), a Web enabled appliance, a Smartwatch, or a mobile phone (e.g. Smartphone), etc. Network 103 may be any type of wired or wireless network such as a local area network (LAN), a wide area network (WAN) such as the Internet, or a combination thereof. Server 104 may be any kind of server or a cluster of servers and may include a Web or cloud-based server, application server, backend server, or a combination thereof. Server 104 may further include an interface (not shown) to allow devices (e.g. client device 101) to access resources or services provided by server 104. The interface may include a Web interface, an application programming interface (API), or a command line interface (CLI).

In one embodiment, the server 104 may include one or more components (or modules, units, or logic, etc.) as part of a data integration system. In one embodiment, these components may include a scheduler 110, an invoker 120, an assembler 130, a search engine 140, and one or more services 106. In addition, the server 104 may also include, or communicate with, one or more data stores (or storages, or databases, etc.) that store dependency relationships 150, and data 160.

The scheduler 110 may determine a schedule (sequence, or ordering) for initiating processes in response to a request for data. As referred to herein, data may be any form of information in any suitable form of data structure (e.g. search results, files, documents, etc.). As further described herein, data 160 may include primary data or secondary data. The scheduler 110 may determine the schedule based on stored dependency relationships 150 for obtaining data 160. As further described herein, the dependency relationships 150 may be represented as a service dependency graph (SDG). For example, in one embodiment, the SDG may be a directed acyclic graph (DAG).

Based on the determined schedule, the invoker 120 may coordinate the initiation (e.g. calling) of services 106 for obtaining (e.g. retrieving or creating) the data 160. As referred to herein, a service may include any process, operation, function, instruction, computation, method, etc. for determining or retrieving data 160. For example, a service may include simply initiating a retrieval of data from a database. In another example, the service may include performing one or more functions or processes to determine or create data. Once the required data is obtained, an assembler 130 may compile (and assemble, filter, etc.) the obtained data. The combined data may then be provided as a result to the request.

In some embodiments, the request for data may be received from a search engine 140. It should be noted that the components described above, may be part of, or work in conjunction with, a search engine 140. Search engine 140 may include a Web search engine that is designed to search for information on the World Wide Web. The search engine 140 may be any search engine such as a Baidu® search engine available from Baidu, Inc. or alternatively, search engine 140 may represent a Google® search engine, a Microsoft Bing™ search engine, a Yahoo® search engine, or another type of search engine. Search engine 140 may provide a result (or response) based on the obtained data. The result may be provided in any suitable form including information in the form of Web pages, images, advertisement, documents, files, and other types of data structures. The search engine 140 may also maintain real-time information by running an algorithm (e.g. a web crawler) to maintain an index. For example, when a user enters a query (or request) into a search engine (typically by using keywords), the engine examines its index and provides a listing of results. As further described herein, when a request is received, the server 104 may schedule services 106 in real-time to obtain data as part of a result. For example, in response to a query, the search engine 140 may provide compiled data as part of a search result. It should also be noted that search engine 140 may employ various techniques to provide search results (e.g. ranking algorithms), and embodiments herein may be combined with these techniques to provide search results. With respect to the configuration of system 100, other architectures or configurations may also be applicable.

Figure 2:
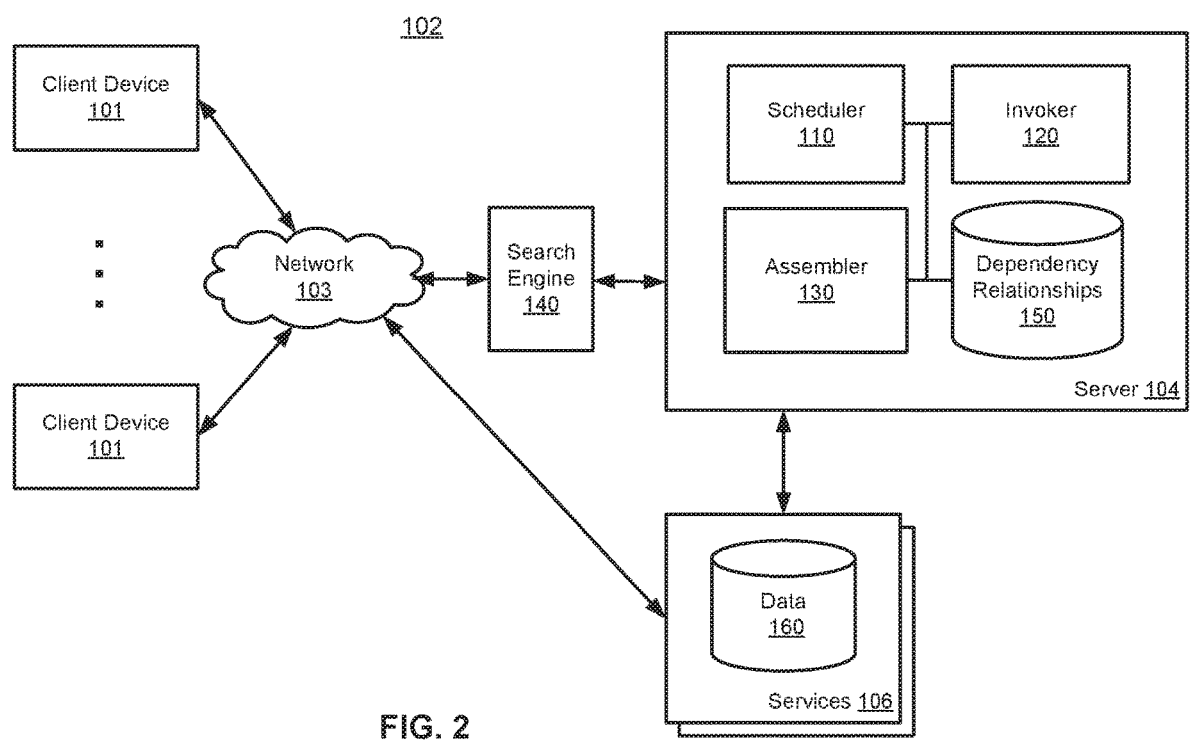
FIG. 2 is a block diagram illustrating another example system configuration according to an embodiment of the disclosure.

FIG. 2 is a block diagram illustrating another example system configuration according to an embodiment of the disclosure. As shown in this additional example configuration, the search engine 140, may be a separate component (e.g. separate server), which transmits requests/responses to the client 101. Accordingly, the search engine 140 may act as an intermediary by communicating with the server 104 (or data integration system). The server 140 may in turn communicate with one or more services 106 as described above, which may also be be part of one or more separate servers. Accordingly, data 160 may be associated and stored with a particular service 106, and thus, may be spread across various servers. It should also be noted that data 160 may be maintained and hosted in a separate server such as a content server over a network. Such a content server or additional servers may be organized and provided by the same provider or organization as of server 104. Alternatively, such a content server or additional servers may be maintained or hosted by separate providers or organizations (e.g., third-party providers), which are responsible for managing content in content databases.

Figure 3:
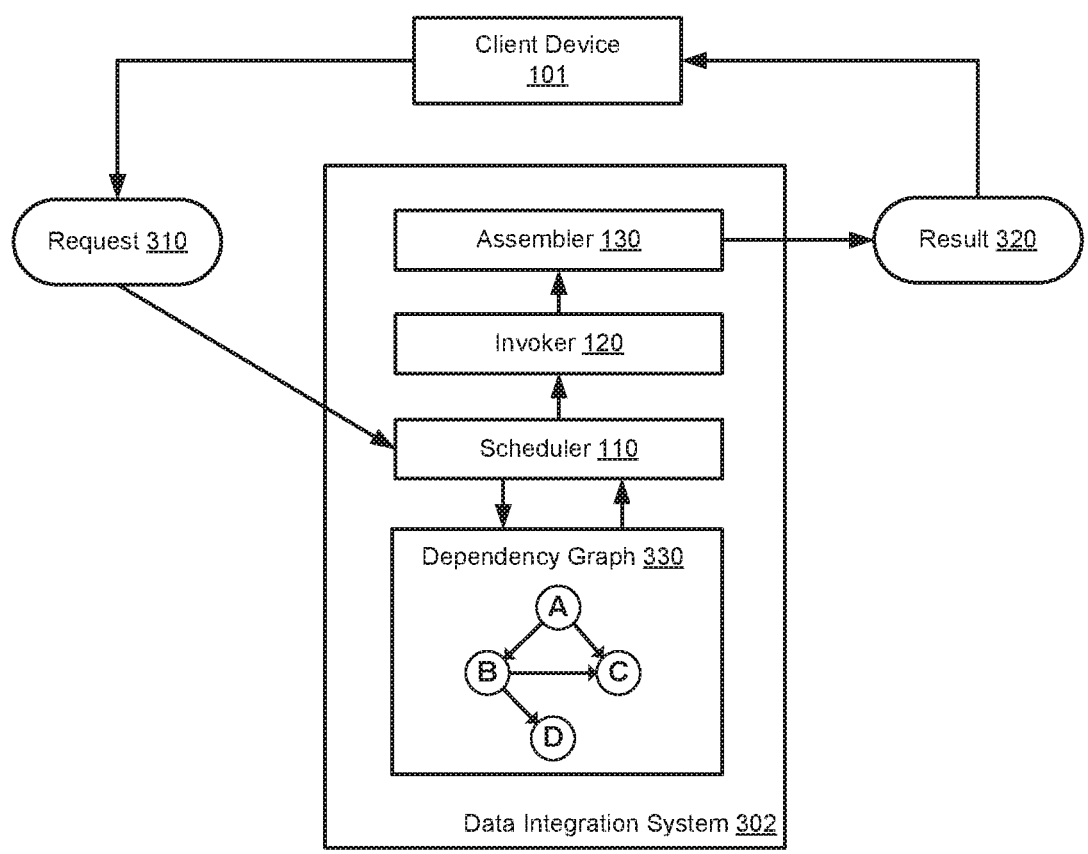
FIG. 3 is a block diagram illustrating an example process flow of a data integration system according to an embodiment of the disclosure.

FIG. 3 is a block diagram illustrating an example process flow of a data integration system 302 according to an embodiment of the disclosure. As shown, a request 310 may be received from a client device 101. A request 310 may include any form of inquiry such as a text query (including a query from a search engine 140 as described above) or other forms of requests. The request 310 may then be processed by the data integration system 302. For example, the data integration system 302 (e.g. server 104) may parse the context of the request 310 and determine requirements for processing the request. In some embodiments, the data integration system 302 may process the request 310 using one or more components as shown above. For example, the processing may include employing the scheduler 110. Based on the requirements for processing the request, the scheduler 110 may reference a dependency graph 330, which may be stored as part of a data store for dependency relationships 150. As further described herein, the dependency graph 330 may be referenced by the scheduler to determine a sequence for calling one or more services (e.g. services 106). Once a sequence for calling the services are determined, the scheduler 110 may provide this information to an invoker 120. As described above, the invoker may coordinate the initiation (e.g. calling) of services (e.g. services 106) for obtaining (e.g. retrieving or creating) the required data. This data may then be provided to an assembler 130 to combine and filer the data. In one embodiment, the assembler 130 then builds a result 320 to provide as a response to the request. The result 320 may then be provided to client device 101.

It should be noted that although the process shows various components, in some embodiments, the process may be performed by the server 104 using operations not necessarily categorized according to the components as shown in this example.

Figure 4A:
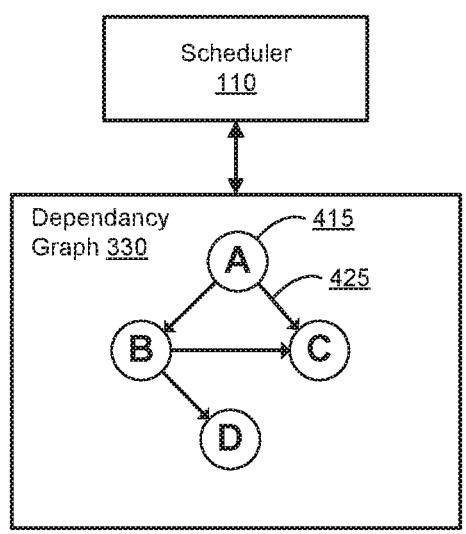
FIG. 4A is a diagram illustrating an example dependency graph according to an embodiment of the disclosure.

FIG. 4A is a diagram illustrating an example dependency graph 330 according to an embodiment of the disclosure. When processing a request (e.g. request 310), the data integration system 302 may determine dependencies between data. In one embodiment, this may include determining dependencies between services (e.g. services 106) that retrieve or create data. As described above, the scheduler 110 may refer to a dependency graph 330 in order to schedule services or directly retrieve data. In some embodiments, the dependency graph 330 may be a directed acyclic graph (DAG) representation as shown in this example. The DAG may include nodes 415 connected by directed edges 425 (or directed arcs, lines, arrows). A service may be represented as a node 415 (e.g. services A, B, C, and D as shown in this example) and a dependency relationship between two services represented as a directed edge (e.g. edge 425). A first service may depend upon one or more other services. Accordingly, the other services are required to be performed prior to the first service. As shown in this example, service A depends upon service B and service C; service B depends upon service C and service D; and services C and D do not depend upon any other services. Accordingly, service B and C must be performed before service A; service C and D performed before service B, and so on. In addition, due to the nature of a DAG, there are no cycle of edges (e.g. loops) in the same direction. For example, although there is a loop of edges between A, B, and C, the loop is not directed in a cycle (e.g. no edge from C to A). Accordingly, there are no cycles of edges in this example. In addition, as shown node A is connected to a node C via an edge A→C (e.g 425), and accordingly, A is called a parent of C, and C is called a child of A. Each node may have zero, one, or many parents, as well as zero, one, or many children.

Due to the nature of DAGs, it may be described in a mathematical context. For example, given a set of objects S and a transitive relation R⊆S×S with (a, b)∈R modeling a dependency "a requires b to be evaluated first," the dependency graph is a graph G=(S, T) with T⊆R and R being the transitive closure of T. In addition, based on the construct of a DAG, the data integration system may derive an evaluation order (or sequence) based on the represented dependencies of services or data. For example, if a dependency graph does not have any circular dependencies (e.g. it is a DAG) an evaluation order may be found by a topological ordering.

Figure 4B:
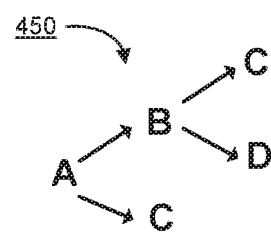
FIG. 4B is a diagram illustrating an example topological ordering of the dependency graph shown in FIG. 4A according to an embodiment of the disclosure.

FIG. 4B is a diagram illustrating an example topological ordering of the dependency graph shown in FIG. 4A according to an embodiment of the disclosure. As described, the scheduler 110 may determine an ordering for services. In a mathematical context, a correct evaluation order is a numbering n: S→N of the objects that form the nodes of the dependency graph so that the following equation holds: n(a)<n(b)⇒(a, b)∉R with a,b∈S. In other words, if the numbering orders two elements a and b such that a will be evaluated before b, then a must not depend on b. It should also be noted that there can be more than a single correct evaluation order. For example, a correct numbering is a topological order, and any topological order is a correct numbering. Thus, any algorithm that derives a correct topological order derives a correct evaluation order. For example, as shown in this example, the dependency graph 330 may be shown as dependency tree 450. As shown, a topological order 460 may include {D, C, B, and A} or {C, D, B, and A}.

Accordingly, based on the determined dependencies, the data integration system (e.g. scheduler 110) may determine a call sequence. The sequence may include calling certain services prior to other services, as well as calling certain services in parallel (or simultaneously). For example, in this example, services C and D may be called (e.g. executed) in parallel. This provides any efficiency and provides the ability for the system (or developer) to efficiently manage resources.

When determining the topological order, the data integration system may employ any suitable algorithm. In addition, in some embodiments, particular nodes may be weighted and an ordering may be based on the particular weights of each node. For example, certain services may be prioritized based on a weighting. Nodes may also be logically manipulated or combined based on one or more implementation requirements.

When obtaining data required for the request, various services or retrievals may be required. For example, it is typically not the case that the data required for the request may be retrieved from a single source or service. Accordingly, in some embodiments, other forms of data such as secondary data is required in order to provide a response to the request. As referred to herein, secondary data may include any form of data that may be part of, or associated with, primary data (or data). For example, primary data may be the data requested by a user via the client device (e.g. client device 101). In some embodiments, secondary data may be required to retrieve or determine the primary data. For example, secondary data may be information used as indexing information for primary data.

For example, in the context of the dependency graph 330 shown in FIGS. 4A and 4B, a request 310 may include retrieving user information and contextual information. Such information may include information such as age, user profile name, picture, employment information, geographic location, prior search history, social networking connections, etc. Accordingly, one or more services 106 may be utilized to derive such information. Accordingly, in such an example the user information and contact information may correspond to node A. In order to provide profile information, a picture may be required by accessing service B, and in turn, in order to retrieve picture information, a social networking service D may need to be accessed. Similarly, in order to provide profile information for service A and service B, username information may need to be retrieved from service C. Thus, the dependency graph 330 may provide an efficient ordering for services and data retrieval.

Figure 5:
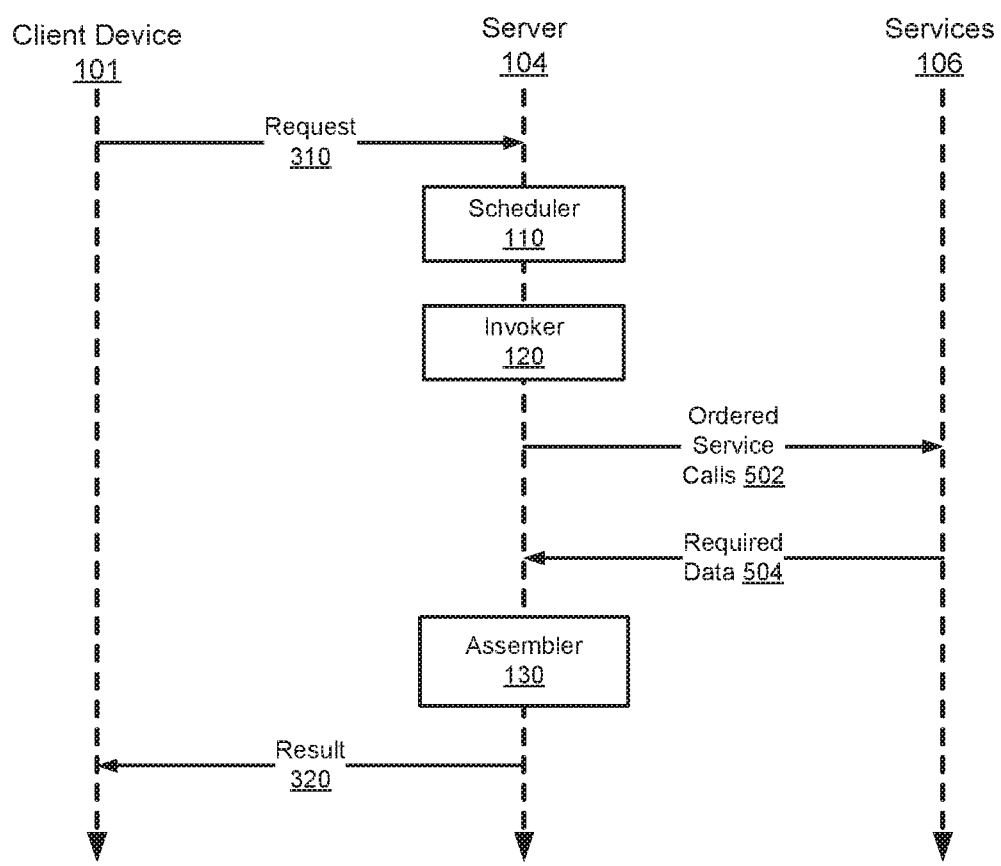
FIG. 5 is an example flow diagram of processing between computing systems according to an embodiment of the disclosure.

FIG. 5 is an example flow diagram of processing between computing systems according to an embodiment of the disclosure. As described above, the data integration system (e.g. data integration system 302), which may reside on or be part of server 104, may communicate and interact with one or more computing devices (e.g. client device 101 and services 106). As described above, a request 310 may be provided by a client device 101 and received at a server 104. The server 104 may process the request including initiating a scheduler 110 to determine a sequence for calling one or more services 106. This sequence may be provided to an invoker 120, which may initiate ordered service calls 502 to one or more services 106. The one or more services 106 may provide required data 504 to the server 104. An assembler 130 may combine and filter the data and provide a result 320 to the client device 101.

Figure 6:
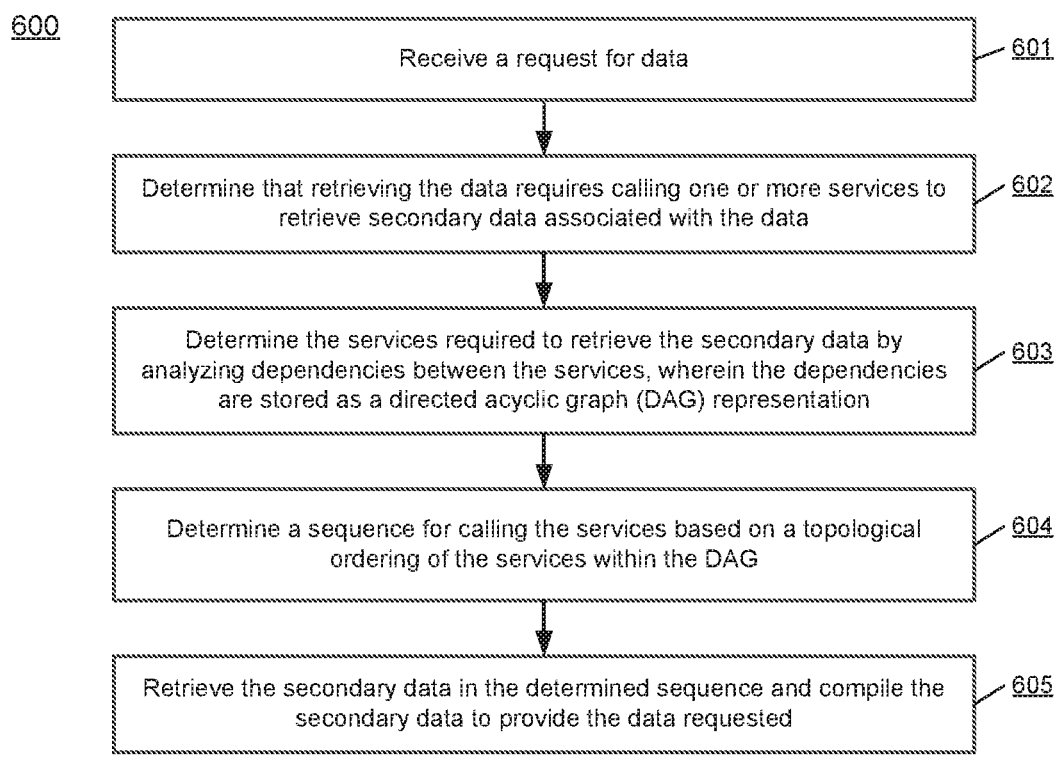
FIG. 6 is an example flow diagram of a method for using a dependency graph for calling services according to an embodiment of the disclosure.

FIG. 6 is an example flow diagram of a method for using a dependency graph for calling services according to an embodiment of the disclosure. Process 600 may use processing logic which may include software, hardware, or a combination thereof. For example, process 600 may be performed by a server (e.g. server 104), or a computing device or device. In block 601, the server may receive a request for data (e.g. request 310). In block 602, the server may determine that retrieving the data requires calling one or more services (e.g. service 106) to retrieve secondary data associated with the data. In block 603, the server may determine the services required to retrieve the secondary data by analyzing dependencies between the services, wherein the dependencies are stored as a directed acyclic graph (DAG) representation (e.g. dependency graph 330), wherein the DAG includes the services as nodes of the DAG and a dependency relationship between two services as a directed edge.

In block 604, the server may determine a sequence for calling the services based on a topological ordering of the services within the DAG. In one embodiment, the sequence may include calling one or more of the services after calling their respective dependent services. For example, as shown in FIG. 4B, service B may be called after calling services C and D. In addition, the sequence may include calling one or more of the services without any remaining dependent services in parallel. For example, as shown in the example of FIG. 4B above, services C and D may be called in parallel. In one embodiment, the retrieved secondary data may be compiled (or assembled) by the first server (e.g. with assembler 130) to provide the requested data. In block 605, the server may retrieve the secondary data in the determined sequence and compile the secondary data to provide the data requested as a result (e.g. result 320). For example, in one embodiment, retrieving the secondary data in the determined sequence includes initiating, by an invoking component (e.g. invoker 120), the services in the determined sequence to retrieve the secondary data from a second server. Accordingly, in some embodiments, the above configuration may provide an efficient mechanism for calling one or more services in response to a request for data.

It should be noted that there may be variations to the flow diagrams or the steps (or operations) described therein without departing from the embodiments described herein. For instance, the steps may be performed in parallel, simultaneously, a differing order, or steps may be added, deleted, or modified. In addition, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

Figure 7:
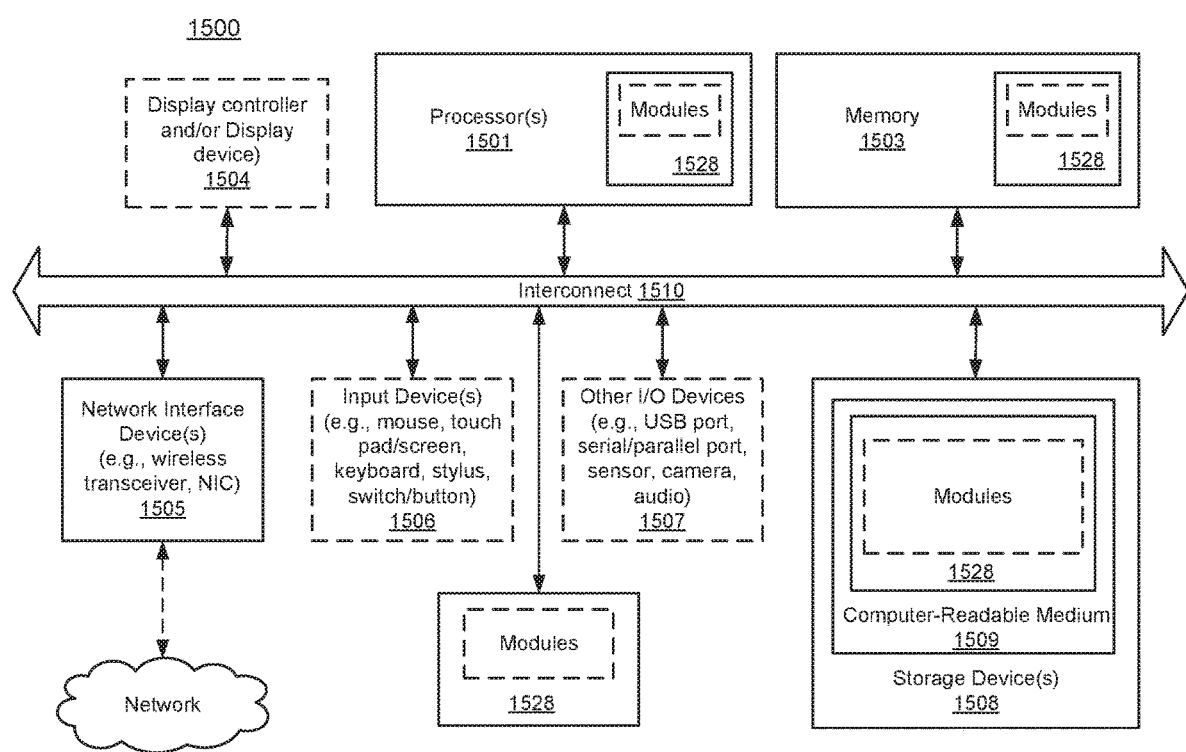
FIG. 7 is a block diagram illustrating an example computing system according to an embodiment of the disclosure.

FIG. 7 is a block diagram illustrating an example computing system according to an embodiment of the disclosure. For example, system 1500 may represents any of data processing systems described above performing any of the processes or methods described above, such as, for example, server 104 or client 101 described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-accessible storage medium 1509 (also known as a machine-readable storage medium or a computer-readable medium) on which is stored one or more sets of instructions or software (e.g., component, module, unit, and/or logic 1528) embodying any one or more of the methodologies or functions described herein.

Component/module/unit/logic 1528 may represent any of the components described above, such as, for example, a search engine 140, scheduler 110, invoker 120, assembler 130, and services 106 (and related modules and sub-modules). Component/module/unit/logic 1528 may also reside, completely or at least partially, within memory 1503 and/or within processor 1501 during execution thereof by data processing system 1500, memory 1503 and processor 1501 also constituting machine-accessible storage media. In addition, component/module/unit/logic 1528 can be implemented as firmware or functional circuitry within hardware devices. Further, component/module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; and phase-change memory).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations for efficiently retrieving data, the operations comprising:
    in response to a request for data, determining that retrieving the data requires calling one or more services to retrieve secondary data associated with the data;
    determining the services required to retrieve the secondary data by analyzing dependencies between the services, wherein the dependencies are stored as a directed acyclic graph (DAG) representation, wherein the DAG includes the services as nodes of the DAG and a dependency relationship between two services as a directed edge, wherein the services include at least one of a process or operation for determining or retrieving the secondary data;
    determining a sequence for calling the services based on a topological ordering of the services within the DAG, wherein, in response to determining that the topological ordering of the services comprises a service having a plurality of dependent services without any remaining dependent services, at least two of the plurality of dependent services without any remaining dependent services are called in parallel; and
    retrieving the secondary data in the determined sequence and compiling the secondary data to provide the data requested.

2. The medium of claim 1, wherein the sequence includes calling one or more of the services after calling their respective dependent services.

3. The medium of claim 2, wherein the at least two of the plurality of dependent services without any remaining dependent services that are called in parallel are called simultaneously.

4. The medium of claim 1, wherein retrieving the secondary data in the determined sequence includes initiating, by an invoking component, the services in the determined sequence to retrieve the secondary data from a second server.

5. The medium of claim 1, wherein compiling the secondary data to provide the data requested includes compiling, by an assembly component, the retrieved secondary data, wherein at least some secondary data associated with the requested data is required, in order to retrieve the requested data.

6. The medium of claim 5, wherein compiling the secondary data to provide the data requested further includes filtering, by the assembly component, the retrieved secondary data.

7. The medium of claim 1, wherein the DAG is precompiled and stored prior to receiving the request for data, and the stored precompiled DAG is retrieved and called in response to receiving the request for data.

8. A computer-implemented method of efficiently providing data, comprising:
    in response to a request for data, determining that retrieving the data requires calling one or more services to retrieve secondary data associated with the data;
    determining the services required to retrieve the secondary data by analyzing dependencies between the services, wherein the dependencies are stored as a directed acyclic graph (DAG) representation, wherein the DAG includes the services as nodes of the DAG and a dependency relationship between two services as a directed edge, wherein the services include at least one of a process or operation for determining or retrieving the secondary data;
    determining a sequence for calling the services based on a topological ordering of the services within the DAG, wherein, in response to determining that the topological ordering of the services comprises a service having a plurality of dependent services without any remaining dependent services, the at least two of the plurality of dependent services without any remaining dependent services are called in parallel; and
    retrieving the secondary data in the determined sequence and compiling the secondary data to provide the data requested.

9. The method of claim 8, wherein the sequence includes calling one or more of the services after calling their respective dependent services.

10. The method of claim 9, wherein the at least two of the plurality of services without any remaining dependent services that are called in parallel are called simultaneously.

11. The method of claim 8, wherein retrieving the secondary data in the determined sequence includes initiating, by an invoking component, the services in the determined sequence to retrieve the secondary data from a second server.

12. The method of claim 8, wherein compiling the secondary data to provide the data requested includes compiling, by an assembly component, the retrieved secondary data, wherein at least some secondary data associated with the requested data is required, in order to retrieve the requested data.

13. The method of claim 12, wherein compiling the secondary data to provide the data requested further includes filtering, by the assembly component, the retrieved secondary data.

14. The method of claim 9, wherein the DAG is compiled and stored prior to receiving a second request for data, and the stored precompiled DAG is retrieved and called in response to the second request for the data.

15. A data processing system, comprising:
a processor; and
a memory coupled to the processor, the memory storing instructions, which when executed by the processor, cause the processor to perform operations for efficiently retrieving data, the operations comprising:
in response to a request for data, determining that retrieving the data requires calling one or more services to retrieve secondary data associated with the data,
determining the services required to retrieve the secondary data by analyzing dependencies between the services, wherein the dependencies are stored as a directed acyclic graph (DAG) representation, wherein the DAG includes the services as nodes of the DAG and a dependency relationship between two services as a directed edge, wherein the services include at least one of a process or operation for determining or retrieving the secondary data,
determining a sequence for calling the services based on a topological ordering of the services within the DAG, wherein, in response to determining that the topological ordering of the services comprises a service having a plurality of dependent services without any remaining dependent services, the at least two of the plurality of dependent services without any remaining dependent services are called in parallel, and
retrieving the secondary data in the determined sequence and compiling the secondary data to provide the data requested.

16. The system of claim 15, wherein the sequence includes calling one or more of the services after calling their respective dependent services.

17. The system of claim 16, wherein the at least two of the plurality of dependent services without any remaining dependent services that are called in parallel are called simultaneously.

18. The system of claim 15, wherein retrieving the secondary data in the determined sequence includes initiating, by an invoking component, the services in the determined sequence to retrieve the secondary data from a second server.

19. The system of claim 15, wherein compiling the secondary data to provide the data requested includes compiling, by an assembly component, the retrieved secondary data, wherein at least some secondary data associated with the requested data is required, in order to retrieve the requested data.

20. The system of claim 19, wherein compiling the secondary data to provide the data requested further includes filtering, by the assembly component, the retrieved secondary data.

21. The system of claim 16, wherein the DAG is compiled and stored prior to receiving a second request for data, and the stored precompiled DAG is retrieved and called in response to the second request for data.

* * * * *